United States Patent [19]

Sako et al.

[11] Patent Number: 4,546,474
[45] Date of Patent: Oct. 8, 1985

[54] METHOD OF ERROR CORRECTION

[75] Inventors: Yoichiro Sako; Kentaro Odaka, both of Tokyo, Japan

[73] Assignee: Sony Corporation, Tokyo, Japan

[21] Appl. No.: 684,161

[22] Filed: Dec. 21, 1984

Related U.S. Application Data

[63] Continuation of Ser. No. 613,761, May 24, 1984, abandoned, which is a continuation of Ser. No. 275,328, Jun. 19, 1981, abandoned.

[30] Foreign Application Priority Data

Jun. 20, 1980 [JP] Japan .................................. 55-84424
Jun. 20, 1980 [JP] Japan .................................. 55-84427
Jun. 20, 1980 [JP] Japan .................................. 55-84428

[51] Int. Cl.$^4$ .......................................... G06F 11/10
[52] U.S. Cl. ........................................ 371/39; 371/40; 371/37
[58] Field of Search .................... 371/37, 39, 38, 40

[56] References Cited

U.S. PATENT DOCUMENTS

| | | | |
|---|---|---|---|
| 3,638,182 | 1/1972 | Burton et al. | 371/39 |
| 3,958,220 | 5/1976 | Marshall | 371/39 |
| 4,206,440 | 6/1980 | Doi et al. | 371/39 |
| 4,238,852 | 12/1980 | Iga et al. | 371/38 |
| 4,306,305 | 12/1981 | Doi et al. | 371/38 |
| 4,330,860 | 5/1982 | Wade et al. | 371/39 |
| 4,336,612 | 6/1982 | Inoue et al. | 371/39 |

Primary Examiner—Michael R. Fleming
Attorney, Agent, or Firm—Lewis H. Eslinger; Alvin Sinderbrand

[57] ABSTRACT

A method of receiving and decoding doubly-encoded, interleaved data occurring in blocks of information words and first and second check words to correct errors occurring due to transmission, includes adding error pointers to indicate uncorrectable errors, and thereafter checking the number of pointers in each block and protecting against miscorrection of errors. The data are decoded in a first decoder and the information words and first check words are corrected by syndromes using the second check words. A pointer is added to any words containing uncorrectable error. Then the words so decoded are deinterleaved and decoded in a second decoder, where the information words are corrected by syndromes using the first check words. Here the pointers show the position of any erroneous words to facilitate error correction. The number and location of erroneous words in each block, at the second decoder, is determined by using the error syndromes. If the erroneous word locations as determined by the syndromes is coincident with the locations indicated by the associated pointers, the erroneous words, up to the predetermined number, are corrected. Finally, uncorrected erroneous words are compensated by interpolation.

14 Claims, 11 Drawing Figures

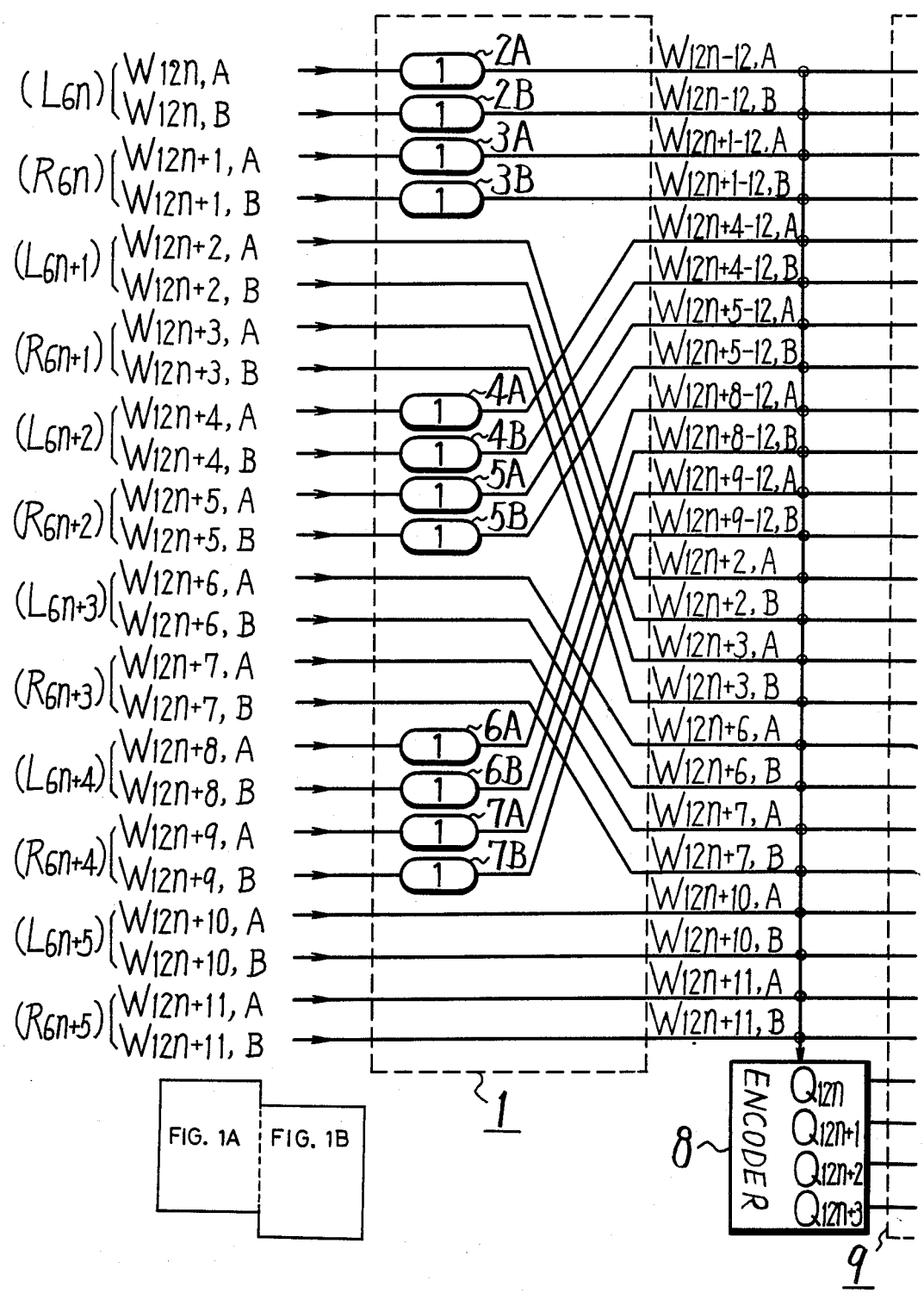

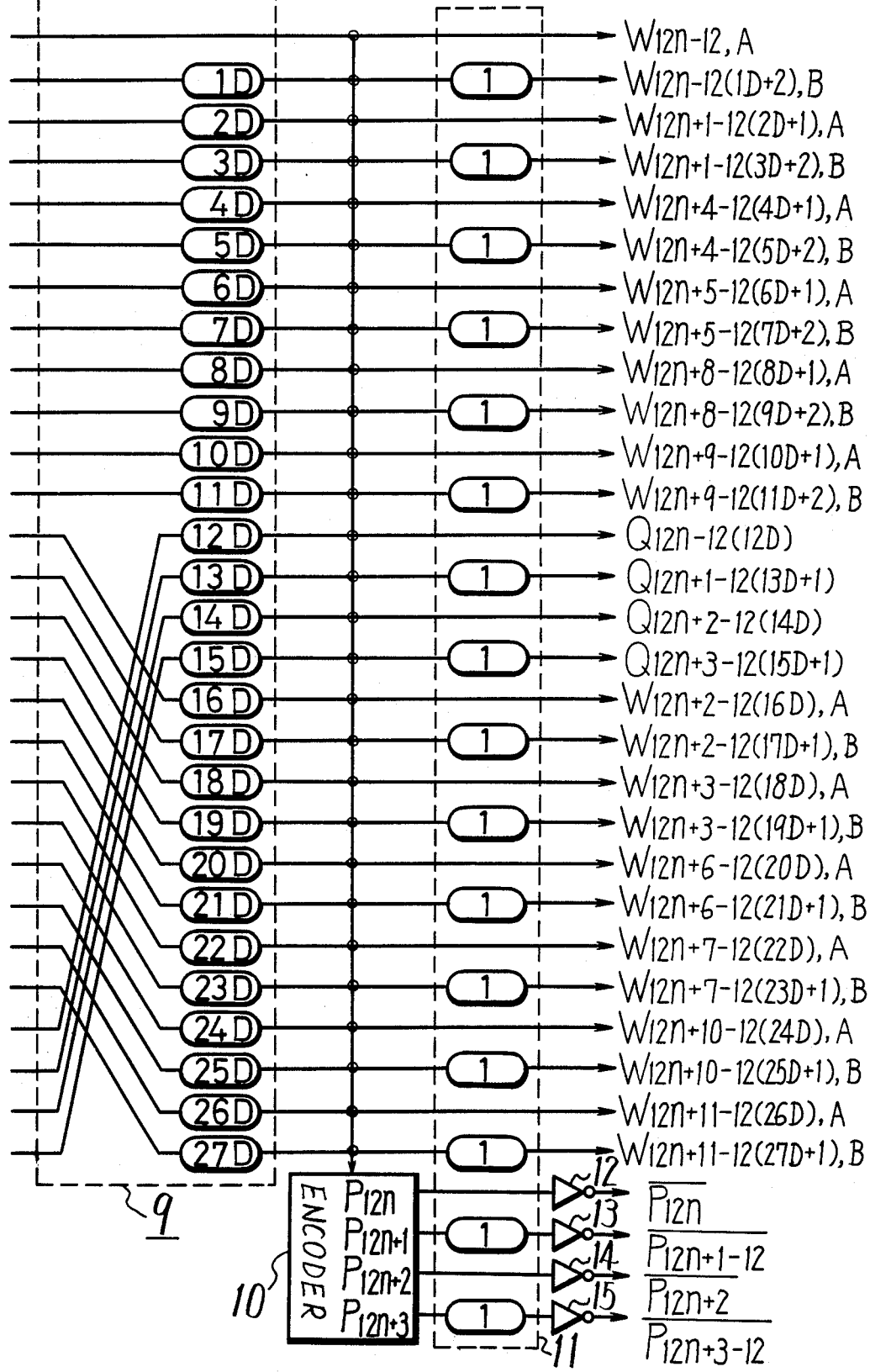

FIG. 2

| 16 BITS | | | | | | | | | | | | | | | | |
|---|---|---|---|---|---|---|---|---|---|---|---|---|---|---|---|---|
| SYNC | $u_1$ | $u_2$ | $u_3$ | $u_4$ | $u_5$ | $u_6$ | $u_7$ | $u_8$ | ---- | $u_{27}$ | $u_{28}$ | $u_{29}$ | $u_{30}$ | $u_{31}$ | $u_{32}$ |

|←—— 1 TRANSMITTING BLOCK    8×32+16 = 272 BITS)——→|

FIG. 5

$$H_{c2} \cdot V^T = \begin{bmatrix} S20 \\ S21 \\ S22 \\ S23 \end{bmatrix}$$

$$= \begin{bmatrix} 1 & 1 & 1 & 1 & 1 & 1 & --- & 1 & 1 & 1 & 1 & 1 \\ \alpha^{27} & \alpha^{26} & \alpha^{25} & \alpha^{24} & \alpha^{23} & \alpha^{22} & --- & \alpha^4 & \alpha^3 & \alpha^2 & \alpha^1 & 1 \\ \alpha^{54} & \alpha^{52} & \alpha^{50} & \alpha^{48} & \alpha^{46} & \alpha^{44} & --- & \alpha^8 & \alpha^6 & \alpha^4 & \alpha^2 & 1 \\ \alpha^{81} & \alpha^{78} & \alpha^{75} & \alpha^{72} & \alpha^{69} & \alpha^{66} & --- & \alpha^{12} & \alpha^9 & \alpha^6 & \alpha^3 & 1 \end{bmatrix} \begin{bmatrix} W_{12n-12,A} \\ W_{12n-12,B} \\ W_{12n+1-12,A} \\ W_{12n+1-12,B} \\ W_{12n+4-12,A} \\ W_{12n+4-12,B} \\ W_{12n+5-12,A} \\ W_{12n+5-12,B} \\ W_{12n+8-12,A} \\ W_{12n+8-12,B} \\ W_{12n+9-12,A} \\ W_{12n+9-12,B} \\ W_{12n+2,A} \\ W_{12n+2,B} \\ W_{12n+3,A} \\ W_{12n+3,B} \\ W_{12n+6,A} \\ W_{12n+6,B} \\ W_{12n+7,A} \\ W_{12n+7,B} \\ W_{12n+10,A} \\ W_{12n+10,B} \\ W_{12n+11,A} \\ W_{12n+11,B} \\ Q_{12n} \\ Q_{12n+1} \\ Q_{12n+2} \\ Q_{12n+3} \end{bmatrix}$$

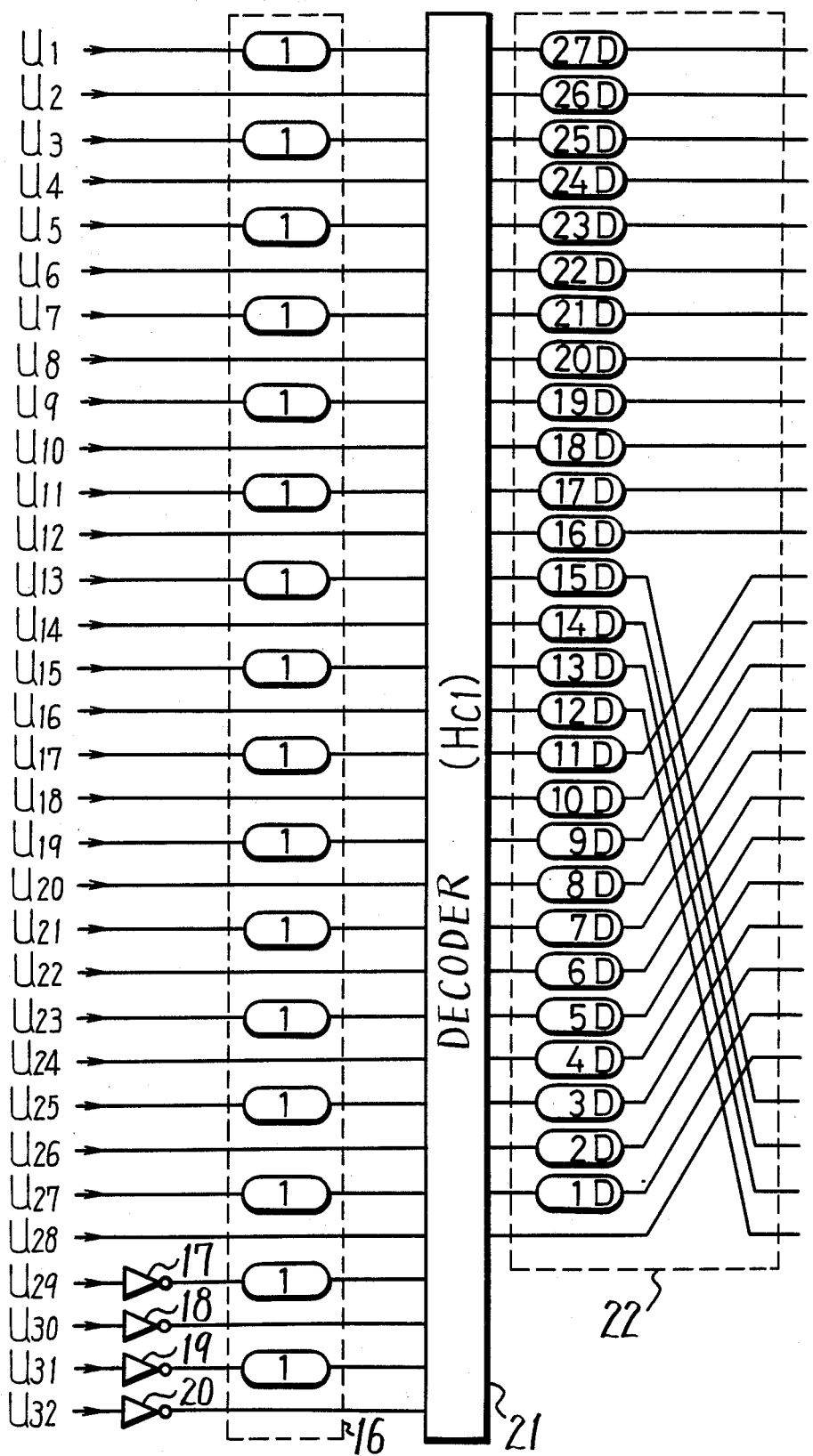

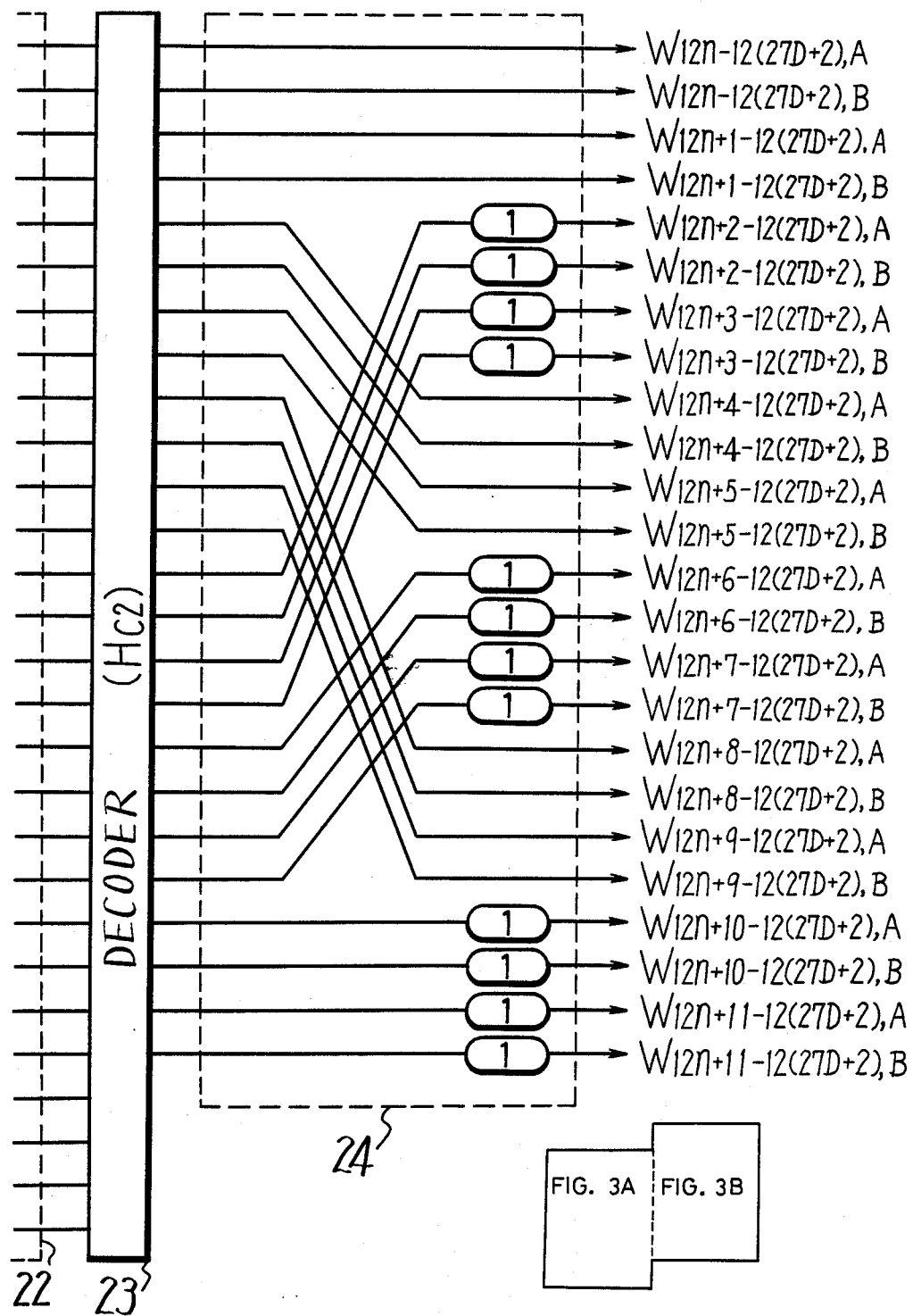

$$H_{c1} \cdot V^T = \begin{bmatrix} S_{10} \\ S_{11} \\ S_{12} \\ S_{13} \end{bmatrix}$$

FIG. 4

$$= \begin{bmatrix} 1 & 1 & 1 & 1 & 1 & \cdots & 1 & 1 & 1 & 1 & 1 \\ \alpha^{31} & \alpha^{30} & \alpha^{29} & \alpha^{28} & \alpha^{27} & \cdots & \alpha^4 & \alpha^3 & \alpha^2 & \alpha^1 & 1 \\ \alpha^{62} & \alpha^{60} & \alpha^{58} & \alpha^{56} & \alpha^{54} & \cdots & \alpha^8 & \alpha^6 & \alpha^4 & \alpha^2 & 1 \\ \alpha^{93} & \alpha^{90} & \alpha^{87} & \alpha^{84} & \alpha^{81} & \cdots & \alpha^{12} & \alpha^9 & \alpha^6 & \alpha^3 & 1 \end{bmatrix} \begin{bmatrix} W_{12n-12,A} \\ W_{12n-12(1D+1),B} \\ W_{12n+1-12(2D+1),A} \\ W_{12n+1-12(3D+1),B} \\ W_{12n+4-12(4D+1),A} \\ W_{12n+4-12(5D+1),B} \\ W_{12n+5-12(6D+1),A} \\ W_{12n+5-12(7D+1),B} \\ W_{12n+8-12(8D+1),A} \\ W_{12n+8-12(9D+1),B} \\ W_{12n+9-12(10D+1),A} \\ W_{12n+9-12(11D+1),B} \\ Q_{12n-12(12D)} \\ Q_{12n+1-12(13D)} \\ Q_{12n+2-12(14D)} \\ Q_{12n+3-12(15D)} \\ W_{12n+2-12(16D),A} \\ W_{12n+2-12(17D),B} \\ W_{12n+3-12(18D),A} \\ W_{12n+3-12(19D),B} \\ W_{12n+6-12(20D),A} \\ W_{12n+6-12(21D),B} \\ W_{12n+7-12(22D),A} \\ W_{12n+7-12(23D),B} \\ W_{12n+10-12(24D),A} \\ W_{12n+10-12(25D),B} \\ W_{12n+11-12(26D),A} \\ W_{12n+11-12(27D),B} \\ P_{12n} \\ P_{12n+1} \\ P_{12n+2} \\ P_{12n+3} \end{bmatrix}$$

METHOD OF ERROR CORRECTION

This is a continuation of application Ser. No. 613,761, filed May 24, 1984, now abandoned, which was a continuation of application Ser. No. 275,328, filed June 19, 1981, now abandoned.

BACKGROUND OF THE INVENTION

1. Field of the Invention

The present invention relates generally to a method of error correction, and in particular is directed to a method of error correction which is high in error correcting ability for both burst errors and random errors and can reduce the possibility that an uncorrected error is overlooked.

2. Description of the Prior Art

There has been previously proposed, for example, in copending application Ser. No. 218,256, filed Dec. 19, 1980, now U.S. Pat. No. 4,355,392, and having a common assignee herewith, a data transmission system effective for correcting burst errors using a so-called cross-interleave technique. In such cross-interleave technique, words in a PCM (pulse code modulated) data signal series are provided in plural sequences on plural respective channels arranged in a first arrangement state, and are furnished to a first error-correcting coder to generate therefrom a first check word series. This first check word series and the PCM data signal series in the plural channels are converted to a second arrangement state. Then, one word in the second arrangement state for each of the PCM data signal sequences in the plural channels is furnished to a second error correcting coder to generate therefrom a second check word series, so that a double interleave (i.e., double rearrangement) is carried out for each word. The purpose of the double interleave is to reduce the number of erroneous words in any group of words contained in a common error-correcting block when the check word contained in such error-correcting block and the PCM data associated therewith are dispersed and transmitted. Any such erroneous words are dispersed among several blocks, and are returned to the original arrangement thereof at the receiving side. In other words, when a burst error develops during transmission, the burst error can be dispersed. If the above interleave is performed twice, the first and second check words each are used to correct words in distinct error correcting blocks. Thus, even if an error cannot be corrected by one of the first and second check words, the error can be corrected by the other check word. Therefore, this technique provides a significant advance in error correcting ability for burst errors.

However, when even one bit in one word is discovered to be in error, the entire word is considered erroneous. Therefore, when a received data signal has a relatively large number of random errors, the above-described double interleave technique is not always sufficiently powerful for correcting these random errors.

To this end, it is proposed that an error correcting code high in error correcting ability, for example, Reed-Solomon (RS) Code, Bose-Chaudhuri-Hocqueghem (BCH) Code, or a variant of a b-adjacent code, which can correct K word errors, for example, two word errors in one block, and can also correct M word errors, for example, three word errors or four word errors, if the location of errors is known, is combined with the above multi-interleave technique.

This error correcting code enables the simplification of the construction of a decoder when only ore word error is to be corrected.

In the case where a first step of decoding is achieved for the second error correcting block, then it is converted to the first arrangement state, and a subsequent step of decoding is carried out for the first error correcting block, it is possible that even if an error exists at the subsequent decoding, it is judged as no error, or the error is not detected, or that four word errors are erroneously judged as one word error. If, due to the above overlooking of error and erroneous error detection, an erroneous error correction is carried out, such error overlooking and erroneous error correction cause subsequent overlooking of errors and erroneous error detection in the next decoding stage. As a result, erroneous operation becomes highly probable. Further, when the number of error words to be corrected increases, the probability of occurrence of the above erroneous correction generally becomes unacceptably high. Therefore, in the case of, for example, audio PCM signals, if data occurs with undetected error and the erroneous data are D-A converted without being corrected, an allophone occurs in the audio analog output.

OBJECTS AND SUMMARY OF THE INVENTION

Accordingly, an object of the present invention is to provide a method of error correction which is effective for both of random errors and burst errors.

It is also an object of this invention to provide an improved method of error correction which can reduce overlooking of errors.

A further object of the invention is to provide a method of error correction which can reduce erroneous error correction.

A further object of the invention is to provide a method of error correction by which the construction of a first stage decoder used in the cross-interleave error correcting method can be simplified.

Another object of the invention is to provide a method of error correction by which allophones are prevented from developing when an audio PCM signal is transmitted.

A still further object of the invention is to provide a method of error correction which is especially effective when used as a decoder of a digital audio disc system.

In accordance with the present invention, a method of decoding transmitted digital information signals to correct errors occurring therein as a result of transmission, wherein the information signals are received as blocks of interleaved digital data word signals and are applied to a first decoder as first error-correcting blocks comprised of a plurality of information word signals, a series of first check word signals associated with the plurality of information word signals, and a series of second check word signals associated with the plurality of information word signals, the information word signals, the first check word signals, and the second check word signals being interleaved, the method comprising the steps of decoding the received digital data word signals in the first decoder and correcting up to a predetermined number of the decoded digital information word signals and the first check word signals by generating error syndromes using the second check word signals, the corrected and decoded digital information word signals forming a block of interleaved word signals, tagging a pointer code signal to each of the information word signals of the block of interleaved word signals to represent whether an uncorrected error remains in such words, and, whenever there are more than the predetermined number of erroneous word signals in such block, giving all word signals thereof a pointer code signal indicating error, delaying the tagged interleaved word signals of each such block of tagged interleaved word signals in a deinterleaving stage by respective different amounts so as to deinterleave such tagged interleaved word signals into a different arranging order, thereby providing a second error-correcting block, decoding the digital information word signals of each such second error-correcting block in the second decoder by generating error syndromes using the first check word signals, and correcting up to another predetermined number of erroneous word signals in such second error correcting blocks where the location of any erroneous word signal as calculated from the error syndromes is coincident with at least one of the erroneous word signals as indicated by the associated pointer code signals, and thereafter compensating any uncorrected erroneous word signals as determined by said pointer code signals.

Other objects, features and advantages of this invention will be apparent from the following description, taken in conjunction with the accompanying drawings.

BRIEF DESCRIPTION OF THE DRAWINGS

FIG. 1 (formed of Figs. 1A and 1B together) is a block diagram showing an example of an error correcting encoder to which the present invention is applied.

FIG. 2 shows an arrangement of a block of encoded data at transmission;

FIG. 3 (formed of FIGS. 3A and 3B together) is a block diagram showing an example of an error correcting decoder to which the present invention is applied; and FIGS. 4, 5, 6, 7, 8 and 9 are diagrams used to explain the operation of the error correcting decoder.

DESCRIPTION OF THE PREFERRED EMBODIMENTS

Figure 6:
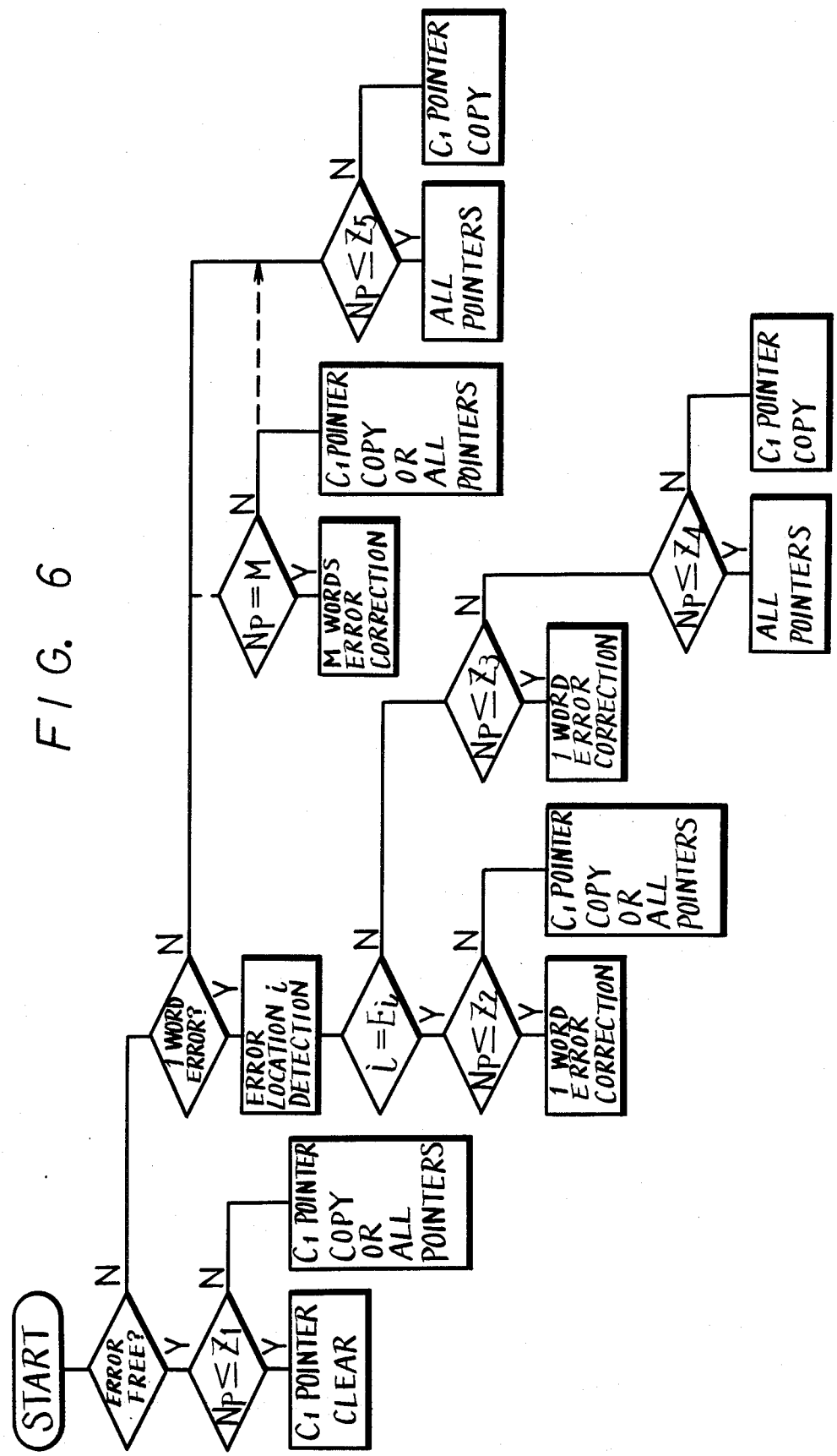

First, an error correcting code used in this invention will be explained. In this discussion, the error correcting code is expressed by a vector representation or a cyclic group representation.

To begin, an irreducible mth order polynominal $F(x)$ will be considered on a galois field $GF(2)$. On the field $GF(2)$ which contains only the elements "0" and "1", the irreducible polynominal $F(x)$ has no real root. Thus, an imaginary (or complex) root $\alpha$, which will satisfy $F(x)=0$, will be considered. At this time $2^m$ different elements $0, \alpha, \alpha^2, \alpha^3, \ldots \alpha^{2^m-1}$, each being a power of $\alpha$ and containing a zero element, form an extension galois field $GF(2^m)$. This extension field $GF(2^m)$ is a polynominal ring with an mth order irreducible polynominal $F(x)$, over the field $GF(2)$ as a modulo. The element of $GF(2^m)$ can be expressed as a linear combination of $1, \alpha=[x], \alpha^2=[x^2], \ldots \alpha^{m-1}=[x^{m-1}]$. That is, these elements can be expressed $$a_0+a_1[x]+a_2[x^2]+\ldots +a_{m-1}[x^{m-1}]=a_0+a_1\alpha+a_2\alpha^2+\ldots a_{m-1}\alpha^{m-1}$$

or $$(a_{m-1}, a_{m-2}, \ldots a_2, a_1, a_0)$$

where $a_0, a_1, \ldots a_{m-1}$ are elements of $GF(2)$.

As an example, consider the extension field $GF(2^8)$ and, as a modulo, the polynominal $F(x)=x^8+x^4+x^3+x^2+1$, (all variables being eight-bit data). This field $GF(2^8)$ can be expressed as follows:

$$a_7x^7+a_6x^6+a_5x^5+a_4x^4+a_3x^3+a_2x^2+a_1x+a_0$$

or $$(a_7, a_6, a_5, a_4, a_3, a_2, a_1, a_0)$$

Therefore, by way of example, $a_7$ is considered the MSB (most significant bit) and $a_0$ is considered the LSB (least significant bit). Since $a_n$ belongs to $GF(2)$, its elements are either 1 or 0.

Further, the polynominal $F(x)$ there is derived the following matrix T of m rows by m columns.

$$T + \begin{bmatrix} 0 & 0 & \ldots & 0 & a_0 \\ 1 & 0 & \ldots & 0 & a_1 \\ 0 & 1 & \ldots & 0 & a_2 \\ \vdots & \vdots & & \vdots & \vdots \\ 0 & 0 & & 1 & a_{m-1} \end{bmatrix}$$

As an alternative expression, there can be used an expression which includes a cyclic group which recognizes that the remainder of the extension galois field $GF(2^m)$ (except the zero element) forms a multiplicative group with the order $2^m-1$. If the elements of $GF(2^m)$ are expressed by using a cyclic group, the following are obtained:

$$0, 1(\alpha^{2^m-1}), \alpha, \alpha^2, \alpha^3, \ldots \alpha^{2^m-2}$$

In the present invention, when m bits form one word and n words form one block, k check words are generated based upon a parity check matrix H, such as the following:

$$H = \begin{bmatrix} 1 & 1 & \ldots & 1 & 1 \\ \alpha^{n-1} & \alpha^{n-2} & \ldots & \alpha & 1 \\ \alpha^{2(n-1)} & \alpha^{2(n-2)} & \ldots & \alpha^2 & 1 \\ \vdots & \vdots & & \vdots & \vdots \\ \alpha^{(k-1)(n-1)} & \alpha^{(k-1)(n-2)} & & \alpha^{k-1} & 1 \end{bmatrix}$$

Further, the parity check matrix H can be similarly expressed by using the matrix T as follows:

$$H = \begin{bmatrix} I & I & \ldots & I & I \\ T^{n-1} & T^{n-2} & \ldots & T^1 & I \\ T^{2(n-1)} & T^{2(n-2)} & & T^2 & I \\ \vdots & \vdots & & \vdots & \vdots \\ T^{(k-1)(n-1)} & T^{(k-1)(n-2)} & & T^{k-1} & I \end{bmatrix}$$

where I is a unit matrix of m rows and m columns.

As mentioned above, the expression using the root $\alpha$ are fundamentally the same as those using a generating matrix T.

Further, if the case where 4 ($k=4$) check words are employed is exemplified, the parity check matrix H becomes as follows:

$$H = \begin{bmatrix} 1 & 1 & & 1 & 1 \\ \alpha^{n-1} & \alpha^{n-2} & \ldots & \alpha & 1 \\ \alpha^{2(n-1)} & \alpha^{2(n-2)} & \ldots & \alpha^2 & 1 \\ \alpha^{3(n-1)} & \alpha^{3(n-2)} & \ldots & \alpha^3 & 1 \end{bmatrix}$$

In this case, if a single block of received data is expressed as a column vector $v = (\hat{W}_{n-1}, \hat{W}_{n-2}, \ldots \hat{W}_1, \hat{W}_0)$ where $\hat{W}_i = W_i + e_i$, and $e_i$ is an error pattern, four syndromes $S_0$, $S_1$, $S_2$ and $S_3$ generated in the receiving side are expressed as follows:

$$\begin{pmatrix} S_0 \\ S_1 \\ S_2 \\ S_3 \end{pmatrix} = H \cdot V^T$$

This error correcting code can correct errors up to two word errors in one error correcting block and also correct three word errors or four word errors if the error location is known.

In each block there are contained four check words ($p = W_3$, $q = W_2$, $r = W_1$, $s = W_0$). These check words can be obtained from the following relationships:

$$p + q + r + s = \Sigma W_i = a$$

$$\alpha^3 p + \alpha^2 q + \alpha r + s = \Sigma \alpha^i W_i = b$$

$$\alpha^6 p + \alpha^4 q + \alpha^2 r + s = \Sigma \alpha^{2i} W_i = c$$

$$\alpha^9 p + \alpha^6 q + \alpha^3 r + s = \Sigma^{3i} W_i = d$$

where $$\Sigma \text{ is } \sum_{i=4}^{n-1}.$$

When the process of the calculation will be omitted, the calculation result is as follows:

$$\begin{pmatrix} p \\ q \\ r \\ s \end{pmatrix} = \begin{pmatrix} \alpha^{212} & \alpha^{153} & \alpha^{152} & \alpha^{209} \\ \alpha^{156} & \alpha^2 & \alpha^{135} & \alpha^{152} \\ \alpha^{158} & \alpha^{138} & \alpha^2 & \alpha^{153} \\ \alpha^{218} & \alpha^{158} & \alpha^{156} & \alpha^{212} \end{pmatrix} \begin{pmatrix} a \\ b \\ c \\ d \end{pmatrix}$$

The coder provided in the transmission side is to form check words p, q, r and s by the above manner.

Next, the fundamental algorithm of the error correction will be described when data including the check words generated as above are transmitted and then received.

[1] If there is no error, the syndromes are all zero:

$$S_0 = S_1 = S_2 = S_3 = 0$$

[2] If there is one word error (an error pattern being represented as $e_i$), $$S_0 = e_i, \quad S_1 = \alpha^i e_i, \quad S_2 = \alpha^{2i} e_i, \quad S_3 = \alpha^{3i} e_i.$$

Thus, the following relations are established:

$$\alpha^i S_0 = S_1$$

$$\alpha^i S_1 = S_2$$

$$\alpha^i S_2 = S_3$$

One word error or not can be judged by whether the above relation is established or not when i is successively changed. On the following relation is established $$\frac{S_1}{S_0} = \frac{S_2}{S_1} = \frac{S_3}{S_2} = \alpha^i$$

Thus, the pattern for $\alpha^i$ is compared with that previously memorized in a ROM (read only memory) to know the error location i. At this time the syndrome $S_1$ becomes the error pattern $e_i$ itself.

[3] In the case of two word errors ($e_i$ and $e_j$), the syndromes follow the relationships:

$$S_0 = e_i + e_j$$

$$S_1 = \alpha^i e_i + \alpha^j e_j$$

$$S_2 = \alpha^{2i} e_i + \alpha^{2j} e_j$$

$$S_3 = \alpha^{3i} e_i + \alpha^{3j} e_j$$

The above equations can be modified as follows:

$$\alpha^j S_0 + S_1 = (\alpha^i + \alpha^j) e_i$$

$$\alpha^j S_1 + S_2 = \alpha^i (\alpha^i + \alpha^j) e_i$$

$$\alpha^j S_2 + S_3 = \alpha^{2i} (\alpha^i + \alpha^j) e_i$$

Accordingly, if the following equations are established, two word errors are discriminated.

$$\alpha^i (\alpha^j S_0 + S_1) = \alpha^j S_1 + S_2$$

$$\alpha^i (\alpha^j S_1 + S_2) = \alpha^j S_2 + S_3$$

If the above equations are established, the block is judged to have two word errors. Thus, the error patterns at this time are expressed as follows:

$$ei = \frac{S_0 + \alpha^{-j} S_1}{1 + \alpha^{i-j}} \text{ and } ej = \frac{S_0 + \alpha^{-i} S_1}{1 + \alpha^{j-i}}$$

[4] Where three word errors ($e_i$, $e_j$, and $e_k$) occur, the syndromes can be expressed:

$$S_0 = e_i + e_j + e_k$$

$$S_1 = \alpha^i e_i + \alpha^j e_j + \alpha^k e_k$$

$$S_2 = \alpha^{2i} e_i + \alpha^{2j} e_j + \alpha^{2k} e_k$$

$$S_3 = \alpha^{3i} e_k + \alpha^{3j} e_j + \alpha^{3k} e_k$$

The above equations can be modified as follows:

$$\alpha^k S_0 + S_1 = (\alpha^i + \alpha^k) e_i + (\alpha^j + \alpha^k) e_j$$

$$\alpha^k S_1 + S_2 = \alpha^i (\alpha^i + \alpha^k) e_i + \alpha^j (\alpha^j + \alpha^k) e_j$$

$$\alpha^k S_2 + S_3 = \alpha^{2i} (\alpha^i + \alpha^k) e_i + \alpha^{2j} (\alpha^j + \alpha^k) e_j$$

Accordingly, the following equations are derived:

$$\alpha^j (\alpha^k S_0 + S_1) + (\alpha^k S_1 + S_2) = (\alpha^i + \alpha^j)(\alpha^i + \alpha^k) e_i$$

$$\alpha^j (\alpha^k S_1 + S_2) + (\alpha^k S_2 + S_3) = \alpha^i (\alpha^i + \alpha^j)(\alpha^i + \alpha^k) e_i$$

Consequently, if the following equation is established, which is a necessary condition for three word errors, then all three word errors can be discriminated.

$$\alpha^i\{\alpha^j(\alpha^k S_0 + S_1) + (\alpha^k S_1 + S_2)\} = \alpha^j(\alpha^k S_1 + S_2) + (\alpha^k S_2 + S_3)$$

The respective error patterns at this time are expressed as follows:

$$ei = \frac{S_0 + (\alpha^{-j} + \alpha^{-k})S_1 + \alpha^{-j-k}S_2}{(1 + \alpha^{i-j})(1 + \alpha^{i-k})}$$

$$ej = \frac{S_0 + (\alpha^{-k} + \alpha^{-i})S_1 + \alpha^{-k-i}S_2}{(1 + \alpha^{j-i})(1 + \alpha^{j-k})}, \text{ and}$$

$$ek = \frac{S_0 + (\alpha^{-i} + \alpha^{-j})S_1 + \alpha^{-i-j}S_2}{(1 + \alpha^{k-i})(1 + \alpha^{k-j})}$$

In fact, the construction of a circuit for correcting three word errors is rather complicated and the time required for the correcting operation is long. Therefore, in practice, an error correcting operation is used in which the above operation is combined with an error correcting operation in which the error locations i, j, k and l are known by an error indication bit, or pointer and the above equations are employed for checking.

[5] Where there are four word errors (ei, ej, ek and el), the syndromes are expressed as follows:

$$S_0 = ei + ej + ek + el$$

$$S_1 = \alpha^i ei + \alpha^j ej + \alpha^k ek + \alpha^l el$$

$$S_2 = \alpha^{2i} ek + \alpha^{2j} ej + \alpha^{2k} ek + \alpha^{2l} el$$

$$S_3 = \alpha^{3i} ei + \alpha^{3j} ej + \alpha^{3k} 3k + \alpha^{3l} el$$

The above equations are modified as follows:

$$ei = \frac{S_0 + (\alpha^{-j} + \alpha^{-k} + \alpha^{-l})S_1 + (\alpha^{-j-k} + \alpha^{-k-l} + \alpha^{-l-j})S_2 + \alpha^{-j-k-l}S_3}{(1 + \alpha^{i-j})(1 + \alpha^{i-k})(1 + \alpha^{i-l})}$$

$$ej = \frac{S_0 + (\alpha^{-k} + \alpha^{-l} + \alpha^{-i})S_1 + (\alpha^{-k-l} + \alpha^{-l-i} + \alpha^{-j-k})S_2 + \alpha^{-k-l-i}S_3}{(1 + \alpha^{j-i})(1 + \alpha^{j-k})(1 + \alpha^{j-l})}$$

$$ek = \frac{S_0 + (\alpha^{-l} + \alpha^{-i} + \alpha^{-j})S_1 + (\alpha^{-l-i} + \alpha^{-i-j} + \alpha^{-j-l})S_2 + \alpha^{-l-i-j}S_3}{(1 + \alpha^{k-i})(1 + \alpha^{k-j})(1 + \alpha^{k-l})}$$

$$el = \frac{S_0 + (\alpha^{-i} + \alpha^{-j} + \alpha^{-k})S_1 + (\alpha^{-i-j} + \alpha^{-j-k} + \alpha^{-k-i})S_2 + \alpha^{-i-j-k}S_3}{(1 + \alpha^{l-i})(1 + \alpha^{l-j})(1 + \alpha^{l-k})}$$

Thus, when the error locations (i, j, k, l) are indicated by pointers, the error can be corrected by the above calculation.

The fundamental algorithm of the above error correction is that at the first step it is checked by the syndromes $S_0$ to $S_3$ whether there is an error or not, at the second step it is checked whether the error is one word error or not, and at the third step it is checked whether the error is two word errors or not. When up to two word errors are corrected, the time to complete all the steps becomes long, which poses a problem especially when the error location of two word errors is obtained.

Now, description will be given on a modified algorithm which is effective when the correction of two word errors are assumed without causing the above problem.

The equations of the syndromes $S_0$, $S_1$, $S_2$ and $S_3$ in the case of two word errors (ei, ej) are as follows:

$$S_0 = ei + ej$$

$$S_1 = \alpha^i ei + \alpha^j ej$$

$$S_2 = \alpha^{2i} ei + \alpha^{2j} ej$$

$$S_3 = \alpha^{3i} ei + \alpha^{3j} ej$$

The above equations are modified as follows:

$$(\alpha^i S_0 + S_1)(\alpha^i S_2 + S_3) = (\alpha^i S_1 + S_2)^2$$

The equation is further modified and the following error location polynominal is obtained:

$$(S_0 S_2 + S_1^2)\alpha^{2i} + (S_1 S_2 + S_0 S_3)\alpha^i + (S_1 S_3 + S_2^2) = 0$$

Now, the constants of the respective terms of the above polynominal are assumed as follows:

$$S_0 S_2 + S_1^2 = A$$

$$S_1 S_2 + S_0 S_3 = B$$

$$S_1 S_3 + S_2^2 = C$$

By using the above constants A, B and C, the error location of two word errors can be obtained.

[1] In the case of no error: $A = B = C = 0$, $S_0 = 0$ and $S_3 = 0$.

[2] In the case of one word error: If $A = B = C = 0$, $S_0 \neq 0$ and $S_3 \neq 0$ are satisifed, the error is judged as one word error. From the relation $\alpha^i = S_1/S_0$, the error location i can be easily determined. Thus, the error is corrected by using the relation $ei = S_0$.

[3] In the case of two word errors:

If an error occurs more than two words, $A \neq 0$, $B \neq 0$ and $C \neq 0$ are established and hence the judgement thereof becomes quite simple.

At this time, the following equation is established: $A\alpha^{2i} + B\alpha^i + C \neq 0$ where $i = 0$ to $(n-1)$.

Now, if it is assumed that $B/A = D$ and $C/A = E$, the following equations are respectively obtained.

$$D = \alpha^i + \alpha^j$$

$$E = \alpha^i \cdot \alpha^j$$

Hence, the following equation is derived, $$\alpha^{2i} + D\alpha^i + E = 0$$

If the difference between two error locations is taken as t, i.e., j=i+t, the following equations are obtained:

$$D = \alpha^i(1+\alpha^t)$$

$$E = \alpha^{2i+t}$$

Accordingly, the following equation is derived:

$$\frac{D^2}{E} = \frac{(1+\alpha^t)^2}{\alpha^t} = \alpha^{-t} + \alpha^t$$

If the value of $\alpha^{-t}+\alpha^t$ of each value of t=b 1 to (n−1) is previously written in a ROM and it is detected that the value is coincident with the value of $D^2/E$ calculated from the output of the ROM and a received word, t can be obtained. If the above coincidence is not t.etected, it means that errors are occurring in more than three words.

Thus, if the following expressions are assumed, $$X = 1 + \alpha^t$$

$$Y = 1 + \alpha^{-t} = D^2/E + X$$

The following expressions are obtained:

$$\alpha^i = D/X$$

$$\alpha^j = D/Y$$

From the above expressions, the error locations i and j are obtained. Then, the error patterns ei and ej are expressed as follows:

$$ei = \frac{(\alpha^j S_0 + S_1)}{D} = \frac{S_0}{Y} + \frac{S_1}{D}$$

$$ej = \frac{(\alpha^i S_0 + S_1)}{D} = \frac{S_0}{X} + \frac{S_1}{D}$$

Thus, the errors can be corrected.

The above modified correction algorithm can much shorten the time required to calculate the error location upon correcting two word errors as compared with that of the fundamental algorithm.

Further, if the number k of the check words is increased, the error correcting ability can be improved accordingly. For example, if k is selected as 6, three word errors can be corrected, and six word errors can be corrected when the error location is known.

Now, an embodiment of the present invention will be described with reference to the attached drawings. Therein the invention is applied, as an example, to the recording and reproducing of an audio PCM signal.

FIG. 1 shows, as a whole, an error correcting encoder provided in the recording system to which is supplied an audio PCM signal as an input signal. To provide this audio PCM signal, left and right stereo signals are respectively sampled at a sampling frequency $f_s$ (for example, 44.1 KHz) and each sampled value is converted into one digital word (which, for example, is encoded as a complement-of-two and has a length of 16 bits). Accordingly, for the left channel of the audio signal there are obtained PCM data words $L_0$, $L_1$, $L_2$ . . . and for the right channel there are obtained PCM data words $R_0$, $R_1$, $R_2$ . . . . The PCM data words of the left and right channels are each separated into six channels, and hence a total of twelve channels of PCM data sequences are input to the error correcting encoder. At any given point in time, twelve words, such as $L_{6n}$, $R_{6n}$, $L_{6n+1}$, $R_{6n+1}$, $L_{6n+2}$, $R_{6n+2}$, $L_{6n+3}$, $R_{6n+3}$, $L_{6n+4}$, $R_{6n+4}$, $L_{6n+5}$ and $R_{6n+5}$, are input into the encoder. In the illustrated example, each word is divided into an upper eight bits and lower eight bits, and hence the twelve channels are processed as twenty-four channels. For the sake of simplicity, each one word of the PCM data is expressed as Wi, its upper eight bits are expressed as Wi, A and its lower eight bits are expressed as Wi, B. For example, the word $L_{6n}$ is divided into two words, $W_{12n}$, A and $W_{12n}$, B.

The PCM data sequences of twenty-four channels are first applied to an even-and-odd interleaver 1. If n is an integer 0, 1, 2 . . . , the words $L_{6n}$ (i.e., $W_{12n}$, A and $W_{12n}$,B), $R_{6n}$(i.e., $W_{12n+1}$,A and $W_{12n+1}$,B), $L_{6n+2}$ (i.e., $W_{12n+4}$,A and $W_{12n+4}$,B), $R_{6n+2}$ (i.e., $W_{12n+5}$, A and $W_{12n+5}$,B), $L_{6n+4}$ (i.e., $W_{12n+8}$,A and $W_{12n+8}$,B), and $R_{6n+4}$ (i.e., $W_{12n+9}$,A and $W_{12n+9}$,B) are respectively even-order words and the remaining words are respectively odd-order words. The PCM data sequences consisting of even-order words are respectively delayed through one word delay circuits or lines 2A, 2B, 3A, 3B, 4A, 4B, 5A, 5B, 6A, 6B, 7A and 7B of the even-and-odd interleaver 1. It is of course possible to delay words larger than one word, for example, eight words. Further, in the even-and-odd interleaver 1, the twelve data sequences consisting of even-order words are converted or shifted so as to occupy the first to twelfth transmission channels and twelve data sequences consisting of odd-order words are converted so as to occupy the thirteenth to twenty-fourth transmission channels, respectively.

The even-and-odd interleaver 1 serves to prevent more than two continuous words of the respective left and right stereo signals from developing errors, in which case the errors become substantially impossible to correct.

To explain the benefit of this feature, three continuous words Li−1, Li, and Li+1 will be considered as an example. When the word Li is erroneous and it is not correctable, it is most desirable that both the surrounding words Li−1 and Li+1 be correct. The reason for this is that in order for an uncorrectable erroneous word Li to be compensated, Li is interpolated between the preceding correct word Li−1 and the following correct word Li+1, usually by taking the mean value of Li−1 and Li+1. The delay lines 2A, 2B, . . . 7A and 7B of the even-and-odd interleaver 1 are provided so that adjacent words will occur in different error correcting blocks. Further, the reason for gathering together groups of transmission channels for the even-order words and the odd-order words is that when the data sequences are interleaved, the distance between the recording positions of the adjacent ever and odd order words should be as great as possible.

At the output of the even-and-odd interleaver 1, the words of the twenty-four channels appear in a first arrangement state. From the interleaver 1 respective PCM data words are applied word by word to an encoder 8 which then generates first check words $Q_{12n}$, $Q_{12n+1}$, $Q_{12n+2}$, and $Q_{12n+3}$, as shown by p, q, r, s in the expression given above.

An error correcting block including the first check words then occurs as follows:

($W_{12n-12}$,A; $W_{12n-12}$,B; $W_{12n+1-12}$,A; $W_{12n+1-12}$,B; $W_{12n+4-12}$,A; $W_{12n+4-12}$,B; $W_{12n+5-12}$,A; $W_{12n+5-12}$,B; $W_{12n+8-12}$,A; $W_{12n+8-12}$,B; $W_{12n+9-12}$,A; $W_{12n+9-12}$,B; $W_{12n+2}$,A; $W_{12n+2}$,B; $W_{12n+3}$,A; $W_{12n+3}$,B; $W_{12n+6}$,A; $W_{12n+6}$,B; $W_{12n+7}$,A; $W_{12n+7}$,B; $W_{12n+10}$,A; $W_{12n+10}$,B; $W_{12n+11}$,A; $W_{12n+11}$,B; $Q_{12n}$; $Q_{12n+1}$; $Q_{12n+2}$; $Q_{12n+3}$)

The first encoder 8 carries out its function by calculating the first check words $Q_{12n}$ to $Q_{12n+3}$ according to the number of words of one block (n=28); the bit length m of each word (m=8); and the number of the check words (k=4).

The twenty-four PCM data word sequences and the four check word series are then applied to an interleaver 9. In this interleaver 9, the relative positions of the channels are changed such that the check word series are located between the PCM data sequences consisting of the even order words and the PCM data sequences consisting of the odd order words, and thereafter a delay process is performed for these interleaving sequences. This delay process is carried out on twenty-seven transmission channels, beginning with the second transmission channels, by delay lines with delay amounts of 1D, 2D, 3D, 4D, ... 26D and 27D, respectively (where D is a unit delay amount).

At the output of the interleaver 9, twenty-eight sequences of data words appear in a second arrangement state. The data words are taken word by word from the respective data sequences and these words are fed to an encoder 10 which then produces second check words $P_{12n}$, $P_{12n+1}$, $P_{12n+2}$ and $P_{12n+3}$ in the same manner as the check words $Q_{12n}$ to $Q_{12n+3}$.

Just as the above encoder 8 provides the above first check words according to the parameters n=28, m=8 and k=4, the similar encoder 10 provides the second check words according to the parameters n=32, m=8 and k=4.

An error correcting block including the second check words and consisting of thirty-two words is formed as follows:

($W_{12n-12}$,A; $W_{12n-12(D+1)}$,B; $W_{12n+1-12(2D+1)}$,A; $W_{12n+1-12(3D+1)}$,B; $W_{12n+4-12(4D+1)}$,A; $W_{12n+4-12(5D+1)}$,B; $W_{12n+5-12(6D+1)}$,A; $W_{12n+5-12(7D+1)}$,B; . . . ; $Q_{12n-12(12D)}$; $Q_{12n+1-12(13D)}$; $Q_{12n+2-12(14D)}$; $Q_{12n+3-12(15D)}$; · · · $W_{12n+10-12(24D)}$,A; $W_{12n+10-12(25D)}$,B; $W_{12n+11-12(25D)}$,A; $W_{12n+11-12(27D)}$,B; $P_{12n}$; $P_{12n+1}$; $P_{12n+2}$; $P_{12n+3}$).

An interleaver 11 is provided thereafter, and includes delay lines of one word delay amount for the even order transmission channels of the thirty-two data sequences including the first and second check words, and inverters 12, 13, 14 and 15 are provided for inverting the second check word series. The interleaver 11 serves to prevent errors occurring over the boundary between the blocks from affecting so many words that it is impossible to correct them. The inverters 12, 13, 14 and 15 serve to prevent misoperation when all the data in one block are made "0" by the occurrence of drop out during transmission. That is to say, if drop out does occur, the inverted check word series will be discriminated correctly in the reproducing system. For the same purpose, inverters may be provided for the first check word series.

The finally-derived twenty-four PCM data sequences and eight check word series are serialized as thirty-two-word blocks and a synchronizing signal of sixteen bits is added to the resulting serial data at the head thereof to form one transmission block as shown in FIG. 2. The block thus made is transmitted on a transmission medium or carrier. In FIG. 2, the word provided from the ith transmission channel is depicted as $U_i$.

Practical examples of the transmission medium, or carrier, for the transmitted signal can include magnetic tape for use in magnetic recording and reproducing apparatus, a disc for use in a rotary disc apparatus, or other similar media.

The reproduced data at every thirty-two words of each block of the transmitted signal are applied to the input of an error correcting decoder shown in FIG. 2. The transmitted data as received at the error correcting decoder may contain one or more errors since the input data are reproduced data. If there is no error, the thirty-two words fed to the input of the decoder coincide with the thirty-two words appearing at the output of the error correcting encoder. At the error correcting decoder a de-interleave process complementary to the corresponding interleave process at the encoder is performed to return the data to its original order. If there is an error, the error correcting process is carried out after the data are restored to the original order.

Initially, as shown in FIG. 3, a de-interleaver 16 is provided in which delay lines, each having a delay amount of one word, are provided for the odd order transmission channels, and inverters 17, 18, 19 and 20 are provided for inverting the received second check word series. The outputs from the de-interleaver 16 and the inverters 17 to 20 are coupled to a first decoder 21. In this first decoder 21, syndromes $S_{10}$, $S_{11}$, $S_{12}$ and $S_{13}$ are generated according to a matrix, such as the Reed-Solomon parity detection matrix $H_{Cl}$ (FIG. 4) by the thirty-two input words $V^T$ as shown in FIG. 4, and the above-mentioned error correction is performed based upon the syndromes $S_{10}$ to $S_{13}$. In FIG. 4, α is an element of a $GF(2^8)$ and a root of $F(x)=x^8+x^4+x^3+x^2+x1$. The decoder 21 derives the corrected twenty-four PCM data sequences and four first check word series. At every individual word of the data sequences, a pointer, or error correcting code, (at least one bit) is added to indicate whether there is an error in the associated word (pointer is "1") or not (pointer is "0"). In FIG. 4 and FIG. 5 and also in the following description, the received one word Wi will be referred to merely as Wi.

The output data sequences from the decoder 21 are applied to a de-interleaver 22 which serves to compensate for the delay process performed by the interleaver 9 in the error correcting encoder, and has corresponding delay lines with respective different delay amounts of 27D, 26D, 25D, ... 2D, and 1D provided for the first to twenty-seventh transmission channels. The output from the de-interleaver 21 is applied to a second decoder 23 in which syndromes $S_{20}$, $S_{21}$, $S_{22}$ and $S_{23}$ are generated according to a matrix, such as the Reed-Solomon parity detection matrix $H_{c2}$ (FIG. 5). The twenty-eight words $V_T$ as shown in FIG. 5 are applied thereto and the above-mentioned error correction is carried out based upon the syndromes $S_{20}$ to $S_{23}$.

The decoder 23 clears the pointer relating to each word whose error is corrected, but does not clear the pointer relating to any word whose error cannot be corrected.

The data sequences appearing at the output of the decoder 23 are applied to an even-and-odd de-interleaver 24, in which the PCM data sequences consisting of the even-order words and the PCM sequences consisting of the odd-order words are rearranged so that they are positioned at alternative transmission channels, and delay lines of one word delay amount are provided for the PCM data sequences consisting of the odd-order words. This compensates for the corresponding operation performed in the encoder prior to transmission. At the output of the even-and-odd de-interleaver 24, there are provided the PCM data sequences which have the original arrangement state and predetermined order restored entirely to that of the digital signal before it was acted upon by the error correcting encoder.

Although not shown in FIG. 3, a compensating circuit is preferably provided at the next stage following the even-and-odd de-interleaver 24 to compensate for uncorrectable errors. For example, a mean-value interpolation can be used whenever errors are not corrected by the decoders 21 and 23, so that any remaining errors are masked and made inconspicuous.

In the second decoder 23, the error correction is carried out by using the pointer, but there are also some modifications during the second decoding. One such error correction is a process ($RC_1$) in which one word error is corrected and another is such a process ($RC_2$) in which two word errors are corrected. Further, there is such a process ($RC_3$) in which three word errors or more are corrected. Further, it is also possible to carry out error correction using the error location determined by the pointer in combination with each of the above error correcting processes.

Within corresponding processes $FC_1$, $FC_2$, and $FC_3$ which add the pointer in the first decoder 21, for one word error, two word errors, and three or more word errors, respectively, the possibility that an error detection is overlooked or erroneous error correction is performed in the next stage of decoding can be reduced by the relation from $FC_1$ to $FC_2$ and from $FC_2$ to $FC_3$. However, on the contrary, such a case may appear more frequently in which although an error of a word is already corrected or a word includes no error carries a pointer thereof which is "1". Hence, at the next stage of decoding error correction becomes difficult or impossible. Therefore, in the combined operation of the first and second decoders 21 and 23, the combinations of $FC_1 \rightarrow RC_1$, $FC_1 \rightarrow RC_2$, $FC_2 \rightarrow RC_1$, $FC_2 \rightarrow RC_2$ and $FC_3 \rightarrow RC_3$ are practical.

In the example of the invention shown in FIG. 3, up to one word is corrected in the first decoder 21 by using the combination $FC_2 \rightarrow RC_1$ in the above combinations. When it is detected that more than two word errors exist in one error correcting block, the pointer of at least one bit is added to all the words of twenty-eight words in the error correcting block, i.e., to all words of the thirty-two word block except the second check words, to indicate the existence of errors as set forth above. This pointer is "1" when there is an error but "0" when there is no error. In the case where one word consists of eight bits, the pointer is added as one bit higher than MSB so that one word is made to consist of nine bits. Then, the words are processed by the de-interleaver 22 and thereafter are fed to the second decoder 23.

In this decoder 23, one word error is corrected by using the number of error words in the first error correcting block indicated by the pointer or error location.

FIG. 6 is a chart showing an example of the error correction operation carried out by the second decoder 23. In FIG. 6 and the ensuing description thereof, the number of erroneous words as indicated by the pointers is expressed by $N_p$ and the error location by the pointers is expressed by Ei. Further, in FIG. 6, Y represents "yes" and N represents "no". (1) The existence or not of an error is determined by the syndromes $S_{20}$ to $S_{23}$. When $S_{20}=S_{21}=S_{22}=0$, it is decided that there is no error. At this time, whether or not $N_p \leq z_1$ is satisfied as examined. If $N_p \leq z_1$, it is judged that there is no error, and then the pointers in the error correcting block are cleared (i.e., made "0"). If, on the contrary $N_p > z_1$, the error detection by the syndromes is judged erroneous and the pointers are maintained unchanged or, alternatively, pointers for all the words in the block are made "1". In the latter case, the value of $z_1$ is selected relatively large, for example, 14.

(2) In the case that there is an error, it is investigated by the calculation of the syndromes whether or not the error is one word error. In the case of one word error, the error location i is obtained. It is detected whether or not the error location i obtained by the calculation of the syndrome coincides with that indicated by the pointers. When plural error locations are indicated by the pointers, it is investigated which error location i coincides with which of the plural error locations indicated by the pointers. If $i = Ei$, it is then examined whether $N_p \leq z_2$ or not, where $z_2$ is, for example, 10. If $N_p \leq z_2$, the error is judged as one word error and then one word error is corrected. If $N_p > z_2$, it is possible that the error is incorrectly adjudged as one word with error. Therefore, the pointer remains unchanged, or alternatively, all the words are deemed erroneous and the respective pointers thereof are made "1".

In the case of $i \neq Ei$, it is investigated whether $N_p \leq z_3$ or not, where $z_3$ is a rather small value, for example, 3. When $N_p \leq z_3$ is established, one word error at the error location i is corrected by the calculation of the syndrome.

In the case of $N_p > z_3$, it is further checked whether $N_p \leq z_4$ or not. When $z_3 < N_p \leq z_4$, it means that although the judgement of one word error by the syndrome is erroneous, $N_p$ is too small. Therefore, in this case the pointers for all words of the block are made "1". On the contrary, in the case of $N_p > z_4$ each pointer remains unchanged. In this case, $z_4$ is, for example, 5.

(3) In the case where there is at least one error, but the error is not a single word error, it is judged whether or not $N_p \leq z_5$. When $N_p \leq z_5$, the pointer is poor or lacks reliability, so that the pointers for all the words are made "1". However, when $N_p > z_5$, the pointers remain as is.

According to the example, although up to two word errors can be corrected at each of the first and second decoders, only the correction of one word error is performed, which lessens the likelihood that in the decoders there is performed incorrect error detection or miscorrection of errors. Further, since the error correction by the calculation of the syndrome is limited to one word error, the structure of the decoders can be much simplified.

(4) As shown in FIG. 6 by the broken line, it is possible to correct errors in up to M words by using the error location indicated by the pointer. Up to four word errors may be corrected, but a pointer erasure method cannot avoid an erroneous correction. Therefore, in consideration of the time and complexity required for a correcting operation, M is selected as about 2. Then, two word errors relating to the error locations i and j indicated by the pointers are corrected. In the case of $N_p \neq M$, the pointers remain unchanged, or the pointers for all the words are changed to those indicating errors.

In the above description, the practical values of the comparison values $z_1$ to $z_5$ relative to the number $N_p$ of the pointers indicating the errors in one block are merely examples. In the above example, the error correcting code has a possible drawback in that if a block contains more than five word errors, it can be incorrectly judged to be error free, and also that if a block contains four or more word errors, it can be incorrectly judged to contain only word error. Therefore, the comparison values may be selected suitably in consideration of the probability that the above error-overlooking or erroneous correction occurs.

As set forth earlier, if two word errors are corrected at the second decoder by using the associated pointers, the error correcting ability can be made high. In this case, after it is discriminated that there is no error and the error is not one word error, the error correction is carried out by the pointer. Therefore, the likelihood that the correction by the pointer becomes erroneous can be reduced.

Figure 7:
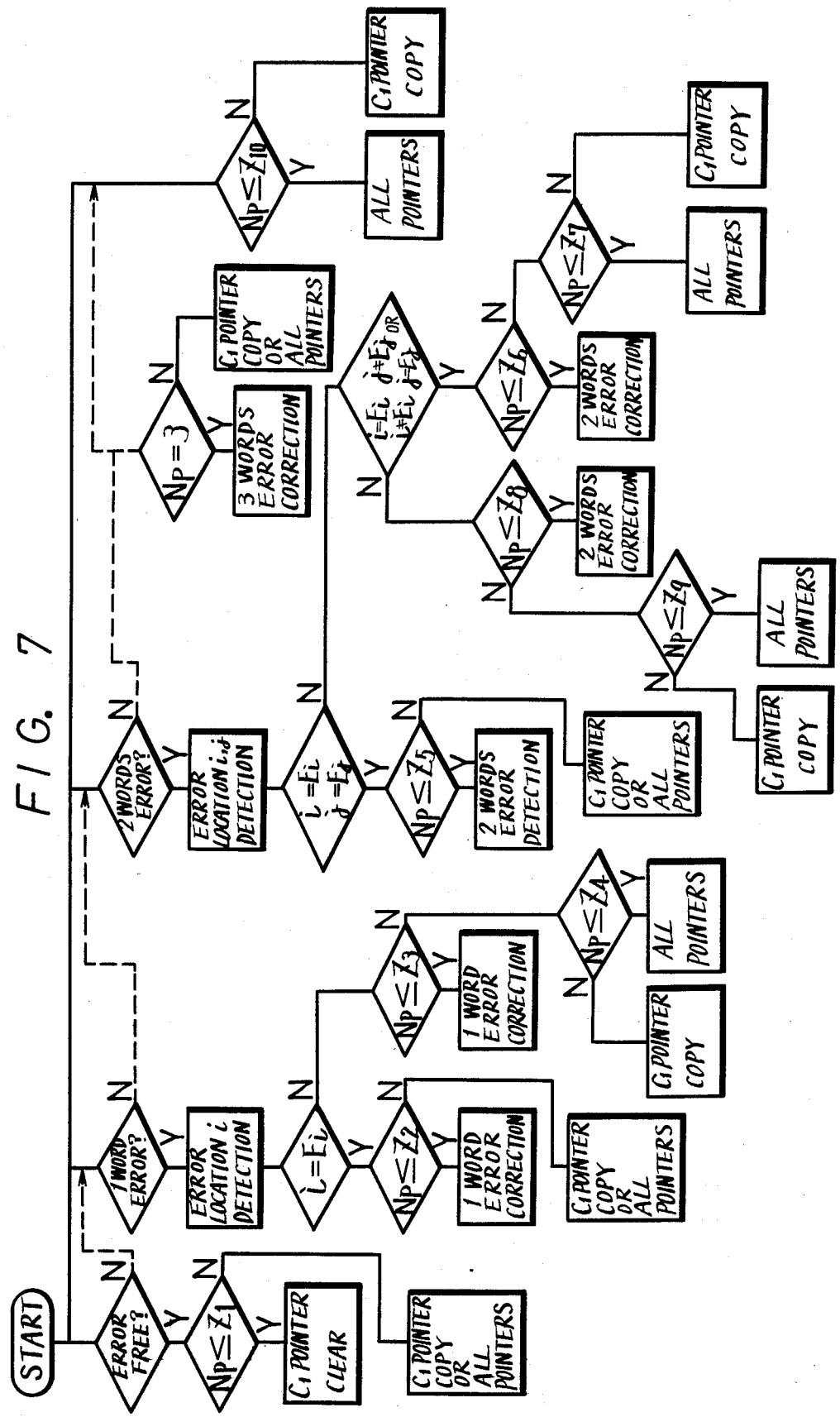

In a second example of the invention, as illustrated in the flow chart of FIG. 7, the combination of $FC_1 \rightarrow RC_2$ in the aforesaid combinations is employed. That is, two word errors are corrected at the first decoder 21. As the error correcting algorithm of this case, the above-mentioned modified algorithm is used. When it is detected that three or more word errors exist in one error correcting block, a pointer of one bit representing the existence or not of error is added to each of the twenty-eight words i.e., all of the words of the thirty-two word block except the check words in the second error correcting block. At the second decoder 23, two word errors are corrected by using the number of error words in the first error correcting block indicated by the pointer or error location. Since two word errors are corrected at the second decoder 23, the modified error correcting algorithm is desired as the error correcting algorithm. In other words, at the beginning of the flow chart shown in the figure, the previously-mentioned error location polynominal $A\alpha^{2i} + B\alpha^i + C = 0$ is calculated and the error correction is performed by using the constants A, B, and C of the above polynominal and the syndromes $S_{20}$ to $S_{23}$. At the same time, the total number $N_p$ of the pointers representing errors contained in one block is checked. It is of course possible to use the fundamental algorithm in which, as shown in FIG. 7 at the broken line, by using the syndrome, the existence of no error is detected, one word error is detected and then two word errors are detected in a step manner.

(1) The existence of error or not is examined. When $A = B = C = 0$, $S_{20} = 0$, and $S_{23} = 0$, it is generally decided that there is no error. At this time, whether or not $N_p \leq z_1$ is satisfied is examined. If $N_p \leq z_1$, it is judged that there is no error, and then the pointer in the error correcting block is cleared (i.e., is made "0"). If, on the contrary, $N_p > z_1$, the error detection by the syndromes is judged incorrect and the pointer is left unchanged or, alternatively, pointers for all words in the block are made "1". In this case, the value of $z_1$ is selected to be relatively large, for example, 14.

(2) It is checked whether or not an error is one word error. When $A = B = C = 0$, $S_{20} \neq 0$, and $S_{23} \neq 0$, the error is generally judged as one word error, and the error location i is obtained from $S_{21}/S_{20} = \alpha^i$. It is detected whether or not the error location i coincides with that indicated by the pointer. When the plural error locations are indicated by the pointers, it is examined whether the error location i coincides with any of them or not. If $i = Ei$, it is then examined whether $N_p \leq z_2$ or not, where $z_2$ is, for example, 10. If $N_p \leq z_2$, the error is judged as one word error and then one word error is corrected by using $ei = S_{20}$. If $N_p > z_2$ even though $i = Ei$, there is a risk that the error is misjudged as one word error, because the number of the pointers is too large for one word error. Therefore, the pointers are left unchanged, or all the words are deemed erroneous and then the respective pointers thereof are made "1".

In the case of $i \neq Ei$, it is checked whether $N_p \leq z_3$ is satisfied or not, where $z_3$ is a rather small value, for example, 3. When $N_p \leq z_3$ is established, one word error at the error location i is corrected by the calculation of the syndrome.

In the case of $N_p > z_3$, it is further checked whether $N_p \leq z_4$ is satisfied or not. When $z_3 < N_p \leq z_4$, it means that although the judgment of one word error by the syndrome is erroneous, $N_p$ is too small. Therefore, in this case the printers for all words of the block are made "1". On the contrary, in the case of $N_p > z_4$, the pointers are left unchanged.

(3) It is checked whether or not an error is two word errors. When the error is two word errors, the error locations i and j are detected by calculation. If $A \neq 0$, $B \neq 0$, $C \neq 0$ and $D^2/E = \alpha^{-t} + \alpha^t$ where $t = 1$ to 27, the error is judged as two word errors and the error locations i and j are obtained by $\alpha^i = D/X$ and $\alpha^j D/Y$. detected whether or not the error locations i and j coincide with those Ei and Ej indicated by the pointers. When $i = Ei$ and $j = Ej$, the number $N_p$ of the pointers representing errors is compared with a predetermined value $z_5$. If $N_p \leq z_5$, two word errors relating to the error locations i and j are corrected. This correction is carried out by obtaining the error patterns ei and ej as set forth previously. If $N_p > z_5$, no correction is performed under the assumption that, for example, three or more word errors are erroneously detected as two word errors, and the pointers are remained unchanged or all the words in the block are judged erroneous.

When one of the error locations i and j coincides with one of the error locations Ei and Ej, i.e., $i = Ei$, $j \neq Ej$ or $i \neq Ei$, $j = Ej$, it is checked whether or not $N_p > z_6$ is satisfied. When $N_p \leq z_6$, two word errors relating to the error locations i and j are corrected. When $N_p > z_6$ it is checked whether $N_p \leq z_7$ is satisfied or not. This check is such that when the error locations are partially coincident, the number of pointers representing errors is checked to see if it is large or small. If $N_p \leq z_7$, it is judged that the number of the pointers is too small and the pointers of all words in the block are made "1". However, if $N_p > z_7$, the reliability of the pointers may be considered high so that the pointers are held unchanged.

When $i \neq Ei$ and $j \neq Ej$, it is checked whether or not $N_p \leq z_8$. If $N_p$ is rather small, the result obtained by using the error location polynominal is considered more significant than the pointers and two word errors relating to the error locations i and j are corrected. When $N_p > z_8$, it is further checked whether or not $N_p \leq z_9$ is satisifed. This check is similar to that of $N_p \leq z_7$ to leave the pointers of the block unchanged or make the pointers of all the words of the block "1".

(4) In the case which is different from any of the above cases (1), (2) and (3), namely where there are more than two word errors, no error correction is performed. In this case, it is checked whether or not $N_p \leq z_{10}$ is satisfied. When $N_p \leq z_{10}$, the reliability of the pointers is judged low and the pointers of all the words are made "1". When $N_p > z_{10}$, the pointers are left unchanged.

(5) In the case of more than two word errors, it may be possible that, for example, three word errors are corrected by using the error locations as determined by pointers. In other words, $N_p = 3$, three word errors relating to the error locations i, j, and k indicated by the pointers are corrected. When $N_p \neq 3$, the pointers are left unchanged or the pointers for all words are made "1".

Further, the value zi, which is compared with the total number $N_p$ of pointers representing the error in one block, is set as a suitable value in consideration of probability of generation of erroneous detection due to the error correcting code (in the above example, when an error is five or more word errors, there is a risk that the above error is judged as no error, when an error is four or more word errors, this error may be judged as one word error, and when an error is three or more word errors, this error may be judged as two word errors).

Figure 8:
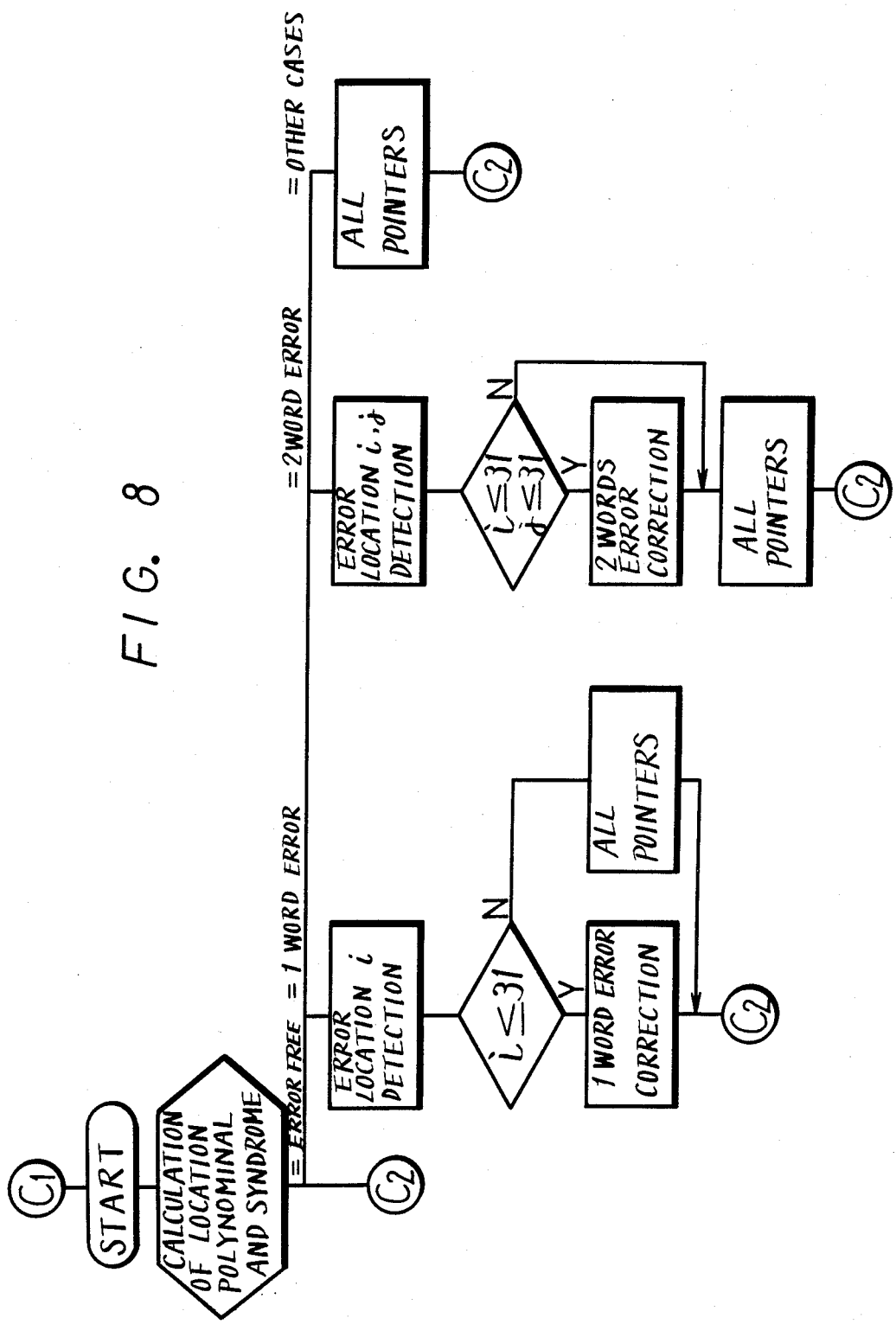

Now, a more practical example of the above error correcting method will be described with reference to FIGS. 8 and 9. As shown with reference to FIG. 8, in the process (step $C_1$) in the first decoder 21, the particular condition of an error is judged by using the above error location polynominal and the error syndrome.

(1) In the case of no error, no pointer is added and the data are unchanged, subjected to the second decoding ($C_2$).

(2) In the case of one word error, the error location is obtained. If the error location is less than or equal to 31, the one word is corrected. Then, if the error location is more than 31, four word errors are erroneously judged as one word error. Pointers, therefore, are added to all words and then the data are decoded at the next stage ($C_2$).

(3) In the case of two word errors, the error locations are calculated. When the error locations are each less than or equal to 31, the two words are corrected and also pointers are added to all words. When there exist error locations more than 31, more than three word errors are erroneously judged as two word errors. Therefore, all the words are given pointers of "1" and thereafter subjected to the next stage of decoding ($C_2$).

(4) In the case of more than two word errors, no correcting operation is carried out, pointers are added to all words and then the data are subjected to the next stage of decoding ($C_2$).

Figure 9:
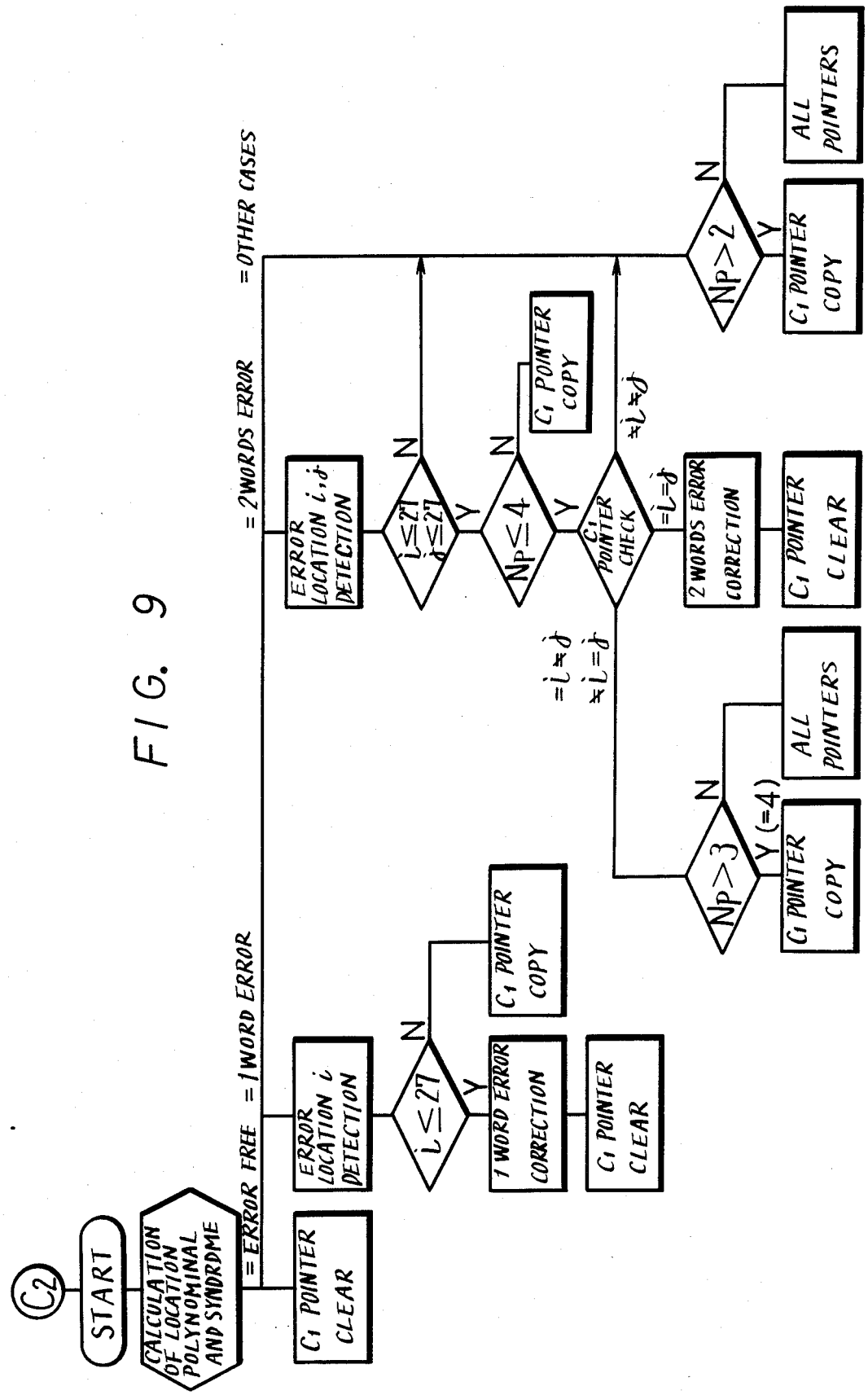

Then, as shown in the flow chart of FIG. 9, in the second decoder 23, similar to the first decoder 21, kind of errors is first judged by the error location polynominal and the error syndromes. (1) In the case of no error, if any pointer added by the first decoder is "1", it is cleared.

(2) In the case of one word error, the error location is calculated. If the error location is less than or equal to 27, the one word is corrected and thereafter the pointer added by the first decoder 21 is cleared. However, when the error location is more than 27, no correcting operation is performed and any pointer added previously remains as is.

(3) In the case of two word errors, the error locations are calculated. When the error locations are both more than 27, three or more word errors are erroneously judged as two word errors. At this time, however, the number of the pointers added in the first decoder 21 is checked. If the number of the pointers exceeds 2, the pointers are held unchanged. If the number of the pointers is less than or equal to 2, even though there are two word errors, pointers are added to all words since the data of the whole block are deemed unreliable. Even when the error locations are less than or equal to 27, if the number of the pointers added in the first decoder 21 is more than four, the pointers added are held unchanged. However, when the number of the pointers is not more than 4, the error location obtained at this stage is compared with the pointer added in the first decoder 21.

(a) When two words are not coincident, no error correcting operation is carried out and the number of pointers is checked. When the number exceeds 2, pointers added are held unchanged. However, when the number of pointers is less than or equal to 2, pointers are added to all words.

(b) When only one of the words is coincident, the number of pointers $N_p$ is also checked. When the number exceeds 3, that is, equals 4, the pointers added are left unchanged. However, if the number is less than or equal to 3, pointers are added to all words.

(c) When two words are both coincident the two words are corrected and thereafter the pointers are cleared.

(4) In the case where an error is judged as three or more words, the number of pointers is checked. When the number exceeds 2, the pointers added are unchanged, while when the number is less than or equal to 2, pointers are added to all words.

As aforesaid, following the above-mentioned decoding process, the words identified by pointers as being erroneous are compensated as uncorrectable.

In the error correcting decoder shown in FIG. 3, error correction using the first check words $Q_{12n}$, $Q_{12n+1}$, $Q_{12n+2}$ and $Q_{12n+3}$ and error correction using the second check words $P_{12n}$, $P_{12n+1}$, $P_{12n+2}$ and $P_{12n+3}$ are each carried out one time. However, if the above error corrections are respectively carried out two times or more (in practice, about two times), the error correcting ability can be increased considerably, since the corrected result is each time less in error. As set forth above, in the case where a decoder is provided further in the latter stage, it is necessary that the check word is corrected in the decoders 21 and 23.

In the above example, in the delay process in the interleaver 9, the delay amount differs from one channel to the next by a constant amount of variation D, but it is also possible to employ an irregular variation in delay amount rather than the above constant variation. Further, the second check words Pi are such error correcting codes which are formed not only from the PCM data words but also the first check words Qi. Similarly, it is possible that the first check words Qi are formed from words including the second check word Pi. To this end, a feedback technique can be employed so that the second check words Pi are fed back to the encoder which produces the first check words.

As will be understood from the above description of an example of the present invention, an error correcting code is employed to correct, for example, up to two word errors without using a pointer code to indicate the error position, and any burst error is dispersed by the cross-interleave operation, so that both random errors and burst errors can be effectively corrected by the technique of this invention.

Further, according to the error correcting code of the invention, since the pointer indicating the presence or not of error is added to every word in accordance with the error detection in the first stage, any risk that the error detection is overlooked and erroneous correction is carried out can be minimized by checking the number of the pointers indicating errors and the error locations by the pointers in the decoding of the next stage.

Further, according to the invention, by using the error location by the pointer, two or more word errors can be corrected in a decoding system having a simple construction. The above fact more than balances with the fact that the construction of the encoder is rather complicated, when the invention is applied to a digital audio disc system (similar in theory to a video disc), and different construction from the encoder is used as a reproducing apparatus. In other words, a few of the complex encoders are used in the manufacture of the digital audio discs, but many thousands of the quite simple decoders are used, one in each audio disc player. Thus, the application of this invention in such a system is quite effective.

It will be apparent that many modifications and variations could be effected by one skilled in the art without departing from the spirit or scope of the present invention, which is to be determined by the appended claims.

What is claimed is:

1. A method of decoding transmitted digital information signals to correct errors occurring therein as a result of transmission, wherein said information signals are received as blocks of interleaved digital data word signals and are applied to a first decoder as first error-correcting blocks comprised of a plurality of information word signals, a series of first check word signals associated with said plurality of information word signals, and a series of second check word signals associated with said plurality of information word signals, said information word signals and said first check word signals being interleaved, comprising the steps of:

decoding the received digital data word signals in said first decoder and correcting up to a predetermined number of the decoded digital information word signals and first check word signals by generating error syndromes using said second check word signals, the corrected and decoded digital information word signals forming a block of interleaved word signals;

tagging a pointer code signal to each of said information word signals of the block of interleaved word signals to represent whether an uncorrected error remains in such words, and, whenever there are more than said predetermined number of erroneous word signals in such block, giving all word signals thereof a pointer code signal indicating error;

delaying the tagged interleaved word signals of each such block of tagged interleaved word signals in a deinterleaving stage by respective different amounts so as to deinterleave such tagged interleaved word signals into a different arranging order, thereby providing a second error-correcting block; and decoding the digital information word signals of each such second error-correcting block in a second decoder by generating error syndromes using said first check word signals and correcting up to another predetermined number of erroneous word signals in such second error correcting blocks where the location of any erroneous word signal as calculated from said error syndromes is coincident with at least one of the erroneous word signals as indicated by the associated pointer code signals.

2. A method of decoding transmitted digital information signals according to claim 1; wherein even if all erroneous word signals up to the first said predetermined number are corrected in the first decoder, a pointer code signal indicating error is nonetheless added to each corrected word signal.

3. A method of decoding transmitted digital information signals according to claim 1; wherein the first said predetermined number is selected to be smaller than the maximum number of erroneous word signals than can be reliably corrected in the first decoder by using the error syndromes if the location of the erroneous word signals is not known.

4. A method of decoding transmitted digital information signals according to claim 1; wherein the first said predetermined number is selected to be the maximum number of erroneous word signals that can be reliably corrected in the first decoder by using the error syndromes if the location of the erroneous word signals is not known.

5. A method of decoding transmitted digital information signals according to claim 1; wherein up to K word signals of the information word signals and first check word signals are corrected in the first decoder, and if the number of erroneous word signals among said information word signals and first check word signals equals or exceeds K, all such word signals are given a pointer code signal to indicate error.

6. A method of decoding transmitted digital information signals according to claim 1; wherein up to K errors among the information word signals and first check word signals are corrected in the first decoder and a pointer code signal to indicate error is given to each word signal so corrected, and when the number of erroneous word signals among said information word signals and first check word signals is greater than an established number smaller than or equal to K, all of the information word signals and first check word signals are given a pointer code signal to indicate error.

7. A method of decoding transmitted digital information signals according to claim 1; wherein each of said first and second check word signals is capable of correcting up to a maximum of K word errors occurring in each of said first and second error-correcting blocks by calculating error syndromes and obtaining erroneous word locations therefrom, and wherein each of said first and second check word signals is capable of correcting up to a maximum of M word errors occurring in each of said first and second error-correcting blocks by calculating said error syndromes and obtaining said erroneous word locations therefrom when said erroneous word locations are determined prior to said error correction, with M greater than K.

8. A method of decoding transmitted digital information signals according to claim 7; wherein in said second decoder when the pointer code signals associated with said second error-correcting block indicating error number up to a pre-established number not more than M, the location of any erroneous word signal indicated thereby is deemed correct, an error syndrome is calculated from the information word signals and first check word signals, and the preselected number of error word signals are corrected by using the erroneous-word location and the error syndrome.

9. A method of decoding transmitted digital information signals according to claim 7; wherein if the number of erroneous word signals among the word signals of said second error-correcting block is determined to be in excess of a predetermined threshold, said second decoder corrects the word signals indicated by the associated pointer code signals as being erroneous.

10. A method of decoding transmitted digital information signals according to claim: 1; wherein said second predetermined number is selected to be the maximum number of erroneous word signals that can be reliably corrected in the second decoder by using the error syndromes if the location of the erroneous word signals is not known.

11. A method of decoding transmitted digital information signals according to claim 1; wherein said second predetermined number is selected to be smaller than the maximum number of erroneous word signals that can be reliably corrected in the second decoder by using the error syndromes if the location of the erroneous word signals is not known.

12. A method of decoding transmitted digital information signals according to claim 1; wherein the number and type of errors contained in the second error-correcting block determines whether said second decoder performs error correction of said information word signals.

13. A method of decoding transmitted digtial information signals according to claim 1; and further comprising, after said decoding of said digital information word signals in said second decoder, compensating any uncorrected erroneous word signals as determined by said pointer code signals.

14. A method of error correction in transmitted data signals in which a first error correcting block is formed of one word signal included in each of a data series of plural channels in a first arranging state and a first check word signal for the one word signal; said data series of plural channels and first check word series signals are delayed by different times at every channel to be converted to a second arranging state; a second error correcting block is formed of one word signal included in each of said data series of plural channels and first check word series signals in the second arranging state and a second check word signal for the latter one word signal; said first and second error correcting blocks are formed in accordance with error correcting code signals so that error syndromes are calculated and errors up to K words included in the same block can be corrected by obtaining error locations from the error syndromes; a first decoding is carried out in a first decoder for the second error correcting block of data series of plural channels; said data series of plural channels and first check word series signals in the second arranging state are delayed by different times at their respective channels to be converted to the first arranging state; and thereafter a second decoding is carried out in a second decoder for the first error correcting block, said method of error correction comprising the steps of:

correcting errors up to a predetermined number of words in said second error correcting block during the first decoding;

tagging a pointer code signal indicating an error to every word signal in a block when error word signals exceeding the predetermined number are detected, thereby indicating that all word signals in the block are unreliable and are assumed to include an error; and calculating an error syndrome from a plurality of word signals included in the first error correcting block and hence correcting error word signals of a predetermined number by obtaining error locations based upon the error syndrome used in the second decoder.

* * * * *